United States Patent [19]

Smale

[11] 4,373,326
[45] Feb. 15, 1983

[54] CERAMIC DUCT SYSTEM FOR TURBINE ENGINE

[75] Inventor: Charles H. Smale, Indianapolis, Ind.

[73] Assignee: General Motors Corporation, Detroit, Mich.

[21] Appl. No.: 199,587

[22] Filed: Oct. 22, 1980

[51] Int. Cl.³ .............................................. F02C 3/10
[52] U.S. Cl. .............................. 60/39.161; 60/39.512
[58] Field of Search .................. 60/39.16 R, 39.51 R, 60/39.51 H; 415/214

[56] References Cited

U.S. PATENT DOCUMENTS

| | | | |
|---|---|---|---|
| 2,428,830 | 10/1947 | Birmann | 60/39.16 R |
| 2,663,141 | 12/1953 | Hage | 60/39.16 R |
| 2,715,814 | 8/1955 | Barr | 60/39.16 R |
| 4,118,927 | 10/1978 | Kronogard | 60/39.16 R |
| 4,286,430 | 9/1981 | Smith | 60/39.16 R |

*Primary Examiner*—Louis J. Casaregola
*Attorney, Agent, or Firm*—J. C. Evans

[57] ABSTRACT

A gas turbine engine has a metal engine block which houses interconnected ceramic duct components defining the gas flow path between a combustor and turbine stages of a two spool gas turbine engine. The ceramic duct components are coupled to the engine block by support cages that accommodate thermal expansion of the duct components to prevent excessive stress levels within the ceramic components throughout a wide range of turbine engine operating conditions.

4 Claims, 3 Drawing Figures

CERAMIC DUCT SYSTEM FOR TURBINE ENGINE

This invention relates to gas turbine engines and more particularly to gas turbine engines having a metal engine block and ceramic gas flow defining duct components supported with respect to the metal engine block.

The invention herein described was made in the performance of work under a NASA contract funded by the Department of Energy of the United States Government.

In order to improve performance and fuel economy ratings of gas turbine engines, especially for use in but not limited to vehicular applications, ceramic components are included at high temperature regions of the engine so as to enable the engine to be operated at higher temperature conditions of operation. The resultant effect of such higher temperature operation, in part, includes an improvement in the operating efficiency thereof through a wide range of engine operating conditions.

An object of the present invention is to provide an improved gas turbine engine for use in vehicular applications having limited engine compartment space and including a metal engine block supported against vibration with respect to the chassis of the vehicle and including an improved hot gas flow system constituting a plurality of ceramic flow path forming members intertwined together to define a volumetrically compact disposition of the flow path and including means for supporting the flow path forming members to the metal case to prevent imposition of excessive stress in the supported ceramic members.

Another object of the present invention is to provide an improved hot gas flow path for a gas turbine engine including dual shaft gas coupled gasifier and power turbines by the provision of an outer metal engine block enclosing a plurality of ceramic duct and scroll members for directing high temperature motive gas from a gas turbine engine combustor through first and second turbine wheels for powering the dual shafts and further including a ceramic exhaust duct interconnecting the outlet of the interconnected turbine stages to the hot gas side of a rotary regenerator assembly and wherein the component ceramic parts of the hot gas flow system are connected by joints to produce zero flow leakage and formed to diffuse the gas as it turns in direction so as to minimize flow losses and wherein the ceramic parts are associated with means for connecting them to the metal engine block to prevent excessive stress buildups in the ceramic parts.

Yet another object of the present invention is to provide an improved gas turbine engine having a metal engine block for housing a rotary regenerator, a gear train, a combustor and first and second drive shafts to operate a gasifier and a power output of the engine and including a ceramic combustor having the outlet thereof connected to a first ceramic scroll with a peripheral flange joined to a ceramic backplate to house a gasifier rotor and wherein a center outlet of the first ceramic scroll is connected to a curved inlet neck segment of a second ceramic scroll with the curved inlet neck segment being looped through the interconnection between the outlet of the combustor and the first scroll to reduce the space requirements of the gas flow path of the gas turbine engine and wherein the second ceramic scroll is connected to a ceramic backplate to define a housing for a power turbine rotor having its drive axis offset to one side of the drive axis of the gasifier rotor; the second scroll having an outlet therefrom connected to an exhaust duct member of ceramic material which is fit within the confines of the interconnection between the first and second scrolls to define a gas flow path coupled to the hot gas side of a rotary regenerator assembly for recovering exhaust heat from the gas system and wherein the aforedescribed ceramic components connected by joints to produce zero flow leakage and formed to diffuse the gas as it turns in direction so as to minimize flow losses and wherein the ceramic parts are supported with respect to the metal engine block so as to reduce excessive stress in the ceramic components.

Yet another object of the present invention is to provide a gas turbine engine of the type set forth in the preceding object wherein peripheral flanges of the ceramic scrolls and backplate are interconnected and include a plurality of peripheral tabs formed thereon aligned with a plurality of spaced guide cages formed by the metal engine block to loosely couple ceramic components forming the hot gas flow path of a gas turbine engine with respect to the metal engine block thereby to accommodate relative thermal expansion therebetween during wide ranges of gas turbine engine operation so as to reduce stress in the ceramic components from externally applied mechanical and differential thermal expansion loadings.

Further objects and advantages of the present invention will be apparent from the following description, reference being had to the accompanying drawings wherein a preferred embodiment of the present invention is clearly shown.

Figure 1:
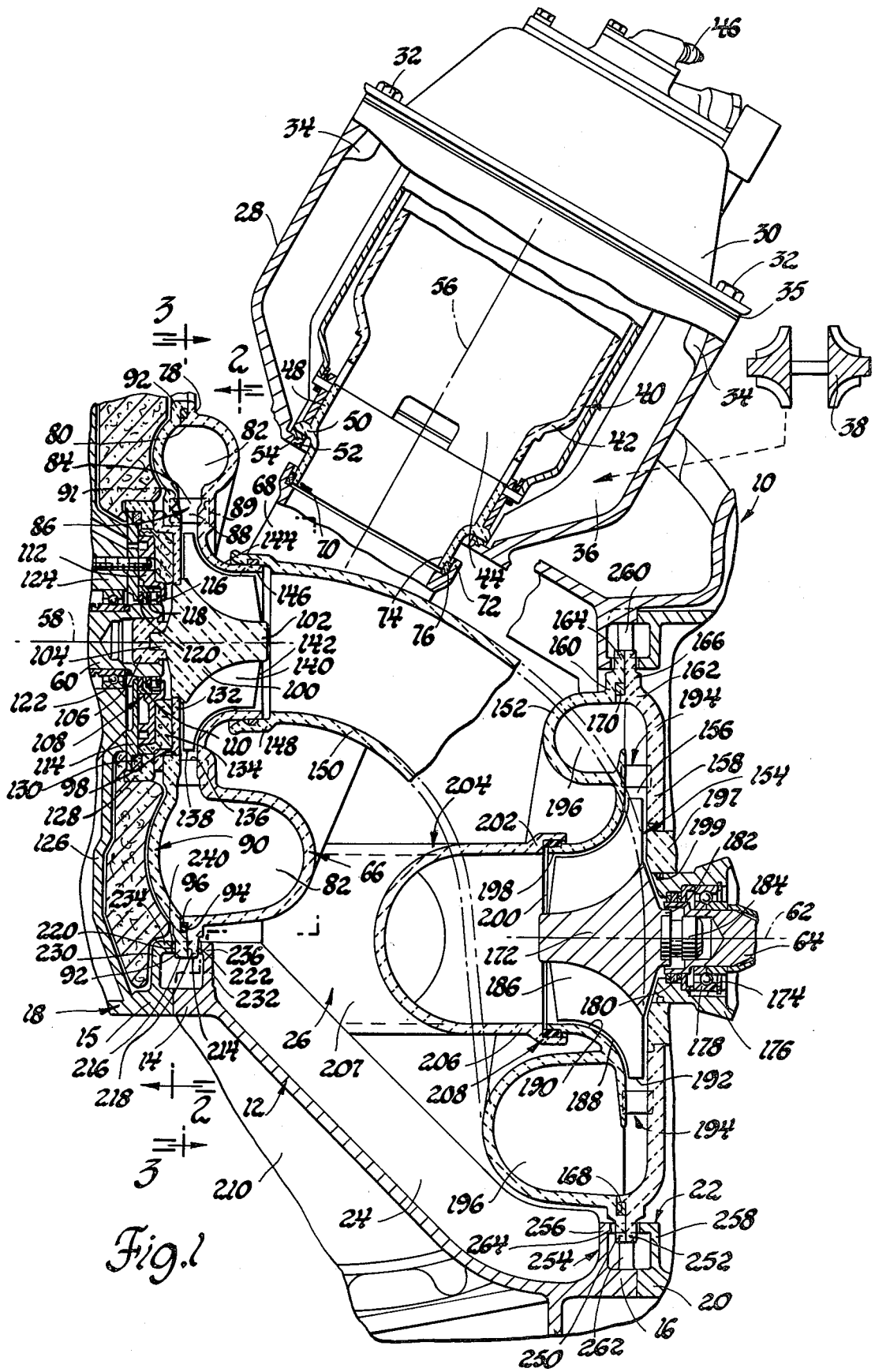
FIG. 1 is a fragmentary view, in vertical section, of a hot gas flow path to a gas turbine engine including the present invention.

Referring now to the drawings, in FIG. 1 a fragmentary portion of an engine block 10 is illustrated. It is a segmented type of block including an intermediate housing 12 having annular flanges 14 and 16 formed on opposite faces thereof. The flange 14 is mated with a flange 15 on a gasifier spool housing 18. The flange 16 is mated with a flange 20 on a power turbine spool housing 22.

The engine block 10 and the component parts thereof define an internal cavity 24, in which is enclosed a highly compact, ceramic duct system 26 that is looped upon itself to occupy a reduced volume so that the volume of the internal cavity 24 is reduced whereby the surrounding engine block 10 can have reduced dimensions and thereby be easily fit within limited confines of the engine compartment of compact and subcompact automotive vehicles and the like.

More particularly, and in accordance with the present invention, the engine block 10 includes an outboard combustor housing 28 including a cover 30 having bolts 32 directed around the outer edge thereof to connect the cover 32 to tapped bosses 34 on the housing 28 thereby to hold a gasket 35 sealed thereagainst thereby to define a sealed plenum 36 which has air directed thereto from the outlet of a gasifier compressor 38. The plenum 36 supplies combustion air to a combustor assembly 40 including a ceramic liner 42 defining a reaction zone 44 in which air from the plenum 36 and fuel from a fuel supply is burned. The fuel supply (not shown) is coupled to a fuel fitting 46 connected to the cover. Combustion products from the reaction zone 44 are directed through an outlet duct 48 also of ceramic material. The outlet duct 48 includes a flange 50 thereon seated on the combustor housing 28 at an outlet 52 therefrom. Flange 50 is supported by an interposed soft bearing seal member 54 which is located between the flange 50 and the housing 28 at the outlet 52 thereof.

In the illustrated arrangement, the ceramic liner 42 and ceramic outlet duct 48 have a longitudinal axis 56 which is inclined as shown in FIG. 1 with respect to the longitudinal axis 58 of a gasifier spool drive shaft 60 and a longitudinal axis 62 of a power spool drive shaft 64. In turn, the longitudinal axes 58, 62 are offset with respect to one another to accommodate the component parts of a compactly arranged ceramic duct system 26 as will be described.

More particularly, the ceramic duct system 26 includes a ceramic gasifier scroll member 66 including an elongated inlet 68 coupled to the outlet duct 48 at a packed joint 70 defined by an outwardly flared end 72 on the inlet 68 and an undercut end 74 on the outlet duct 48 to define an annular space occupied by a high temperature resistant rope packing ring 76 preferably of alumina—boria—silica material.

The ceramic gasifier scroll member 66 further includes a peripheral flange 78 outboard of a shoulder 80 on the scroll that is formed as a constant velocity involute space 82 which directs hot gas flow uniformly to the leading edges 84 of a cascade 86 of nozzle vanes 88. Each vane 88 fits in aligned slots 89, 91 formed in scroll member 66 and a ceramic backplate 90. The shoulder 80 mates against a portion of ceramic backplate 90. Backplate 90 has a peripheral flange 92 thereon formed to define a continuous space 94 for a rope seal member 96 also of alumina—boria—silica material. The backplate 90 has a center opening 98 therein to receive the hub 100 of a ceramic gasifier turbine rotor 102. The hub 100 includes an outboard shaft extension 104 thereon that is connected to the gasifier drive shaft 60 through a thermal plug 106 that constitutes a dam against heat transfer from the high temperature gasifier turbine rotor 102 to cooler operating outboard components of the engine.

In the illustrated arrangement, the shaft 60 has the end thereof in sealing engagement with a surrounding seal assembly 108 including a seal housing 110 secured by a seal retainer plate 112 with respect to an outboard retainer 114 to locate a plurality of annular seal elements 116, 118, and 120 in sealing relationship with the outer periphery of the end of the drive shaft 60. The drive shaft, in turn, is supported by a bearing assembly 122 with respect to a bearing support block 124 that is grounded with respect to a segment 126 of the gasifier spool housing 118. A seal plate 128 is resiliently sealed by means of a convoluted seal 130 with respect to a hub backplate 132 seated in the backplate 90 and insulated from outboard components of the seal and bearing support for the shaft by a high K factor thermal insulating block 134. The gasifier turbine rotor 102 has the hub 100 thereof configured to define a radially inwardly directed gas flow path that directs motive fluid from the trailing edges 136 of each of the nozzle vanes 88 to the inlet tip 138 on each of a plurality of turbine blades 149 that has a trailing edge 142 thereof located at the outlet of an outlet shroud 144 integrally cast in scroll member 66. Shroud 144 is configured to follow the radial edge 146 of each of the blades 140.

In accordance with the present invention the outlet shroud 144 supportingly receives the flanged end 148 of a cylindrical inlet 150 of a ceramic power turbine scroll member 152. Cylindrical inlet 150 diffuses and turns the gas exiting from the gasifier and defines a reverse loop for gas flow from the gasifier turbine rotor to downstream points of the ceramic duct system 26. The inlet 150 is intertwined with respect to the wraparound configuration of the previously described elongated inlet 68 to compact the gas path between the offset axes of the gasifier turbine rotor 102 and a downstream located power turbine rotor 154 that is rotatably supported by the power spool drive shaft 64 in a chamber 156 formed by the ceramic power turbine scroll 152 and a ceramic backplate 158. More particularly, the ceramic power turbine scroll 152 has a peripheral flange 160 thereof mated to a peripheral flange 162 of the backplate 158 and edge formations 164, 166 are formed respectively on the flanges 161, 162 to form an annular space 168 for a rope seal 170 of high temperature resistant material of a type previously described with respect to the upstream gas sealed joints in the high temperature ceramic duct system 26.

In the illustrated arrangement, the power turbine rotor 154 is of ceramic material and has its hub 172 directed through a bore 174 in a bearing housing 176 located outboard of the backplate 158. A bearing assembly 178 rotatably supports the end of the power spool drive shaft 64 therein and a seal assembly 180 in the housing 176 seals against an extension 182 of the shaft in which is fit a thermal plug 184 that couples the shaft 64 to the hub 166 and defines a thermal dam therebetween. The rotor 154 includes a plurality of radial turbine blades 186 thereon with a blade tip 188 contoured to a shroud surface 190 formed on the inboard surface of the scroll member 152. Each blade further includes an inlet edge 192 that receives motive fluid from a cascade of turbine nozzles 194 like those previously described in the first embodiment. Hot gases are directed to the inlet of the cascade of turbine vanes 194 from a constant velocity involute space 196 formed by the scroll member 152 which distributes the gas from the inlet 150 uniformly to the cascade of vanes 194 supplying the power turbine rotor 154. Backplate 158 has an inner center plate 197 which is sealed with respect to housing 176 by an annular O-ring seal 196.

The scroll member has a center outlet 198 defining a shroud surface 200 that directs exhaust gas from the power turbine rotor 154 to the inlet 202 of a ceramic exhaust duct 204 having a tubular inlet 206 thereof coupled to the center outlet at a high temperature gas sealed joint 208 formed therebetween.

The exhaust duct 204 has a cylindrical end 206 looped through a segment of the inlet 150 and has a flared skirt 210 sealingly connected to a block 10 at a hot side seal of a regenerator assembly.

The ceramic duct system thus constitutes a compact, continuously formed gas sealed high temperature resistance ceramic path for flow of combustion products from the combustor assembly 40 during operation of the gas turbine engine. In presently contemplated operating environments the turbine inlet temperature at the gasifier turbine can be in excess of 2000° F. The flow will diffuse through the duct system 26 with minimal loss of pressure due to flow restraint. The compacted flow path is in part formed by the scroll member 66, the reversely looped inlet 150 of the power turbine scroll member 152 which defines along with the backplate 158 a ceramic enclosure for the turbine rotor 154. The path is then reversed and looped back through the inlet 150 by the configuration of the exhaust duct 204 for return to the regenerator of the assembly. The aforedescribed ceramic duct system 26 thus occupies a limited amount of space through the internal cavity 24 to enable the exterior dimensions of the engine case 10 to be held to a minimum for a particular gas turbine installation. The use of ceramic components enable the engine to be operated at elevated temperatures without excessive wear or reduction in strength of component parts of the hot gas flow paths of the engine. Accordingly, the engine can be operated at temperature levels where fuel economy can be maximized.

Figure 2:
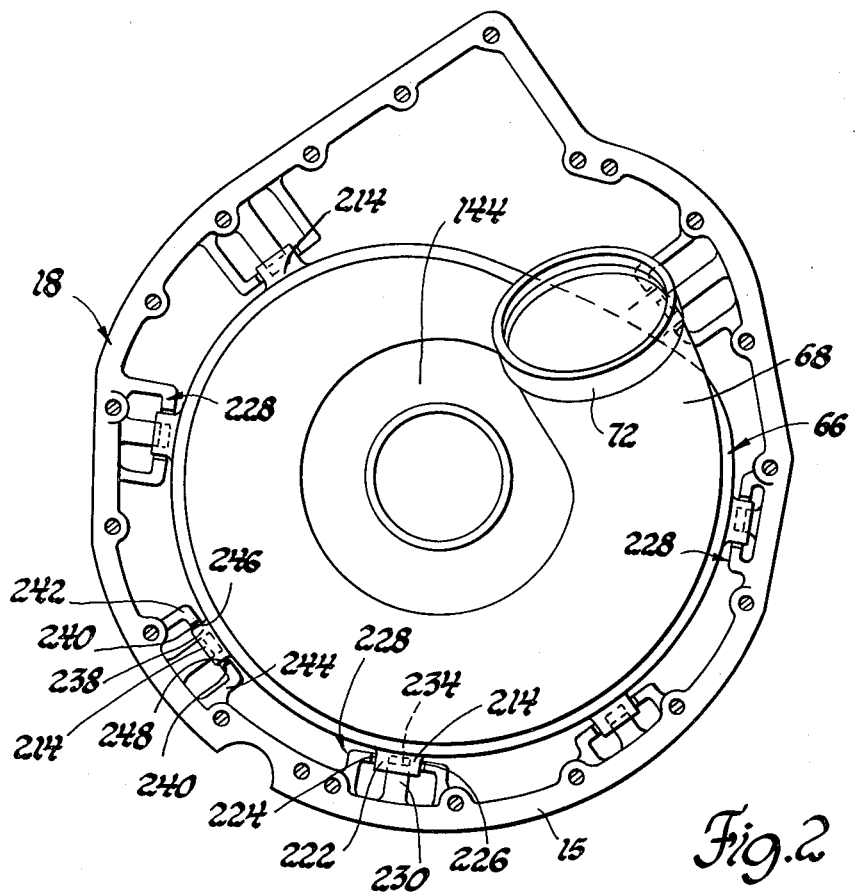
FIG. 2 is a sectional view taken along the line 2—2 of FIG. 1 looking in the direction of the arrows.
Figure 3:
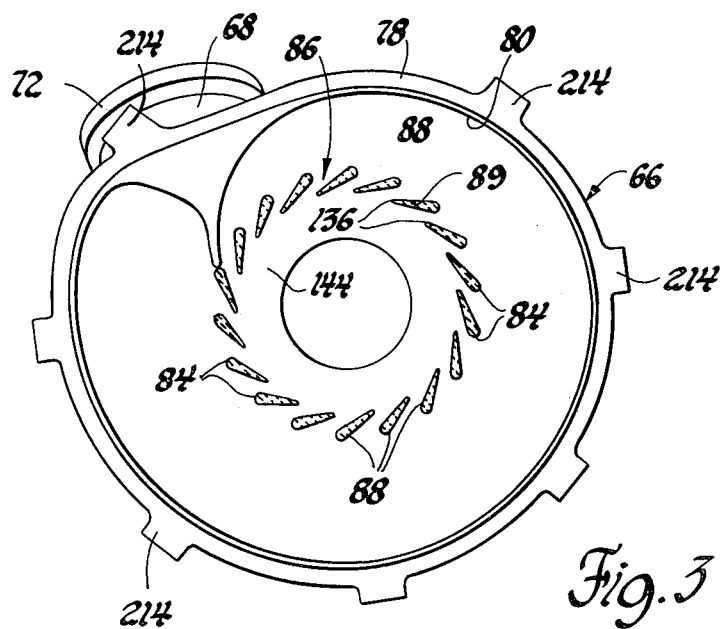
FIG. 3 is a fragmentary vertical sectional view taken along the line 3—3 of FIG. 1.

In accordance with the present invention the high temperature ceramic components are supported and thermally isolated from the surrounding metal of the engine case 10 by an improved support system best shown in FIG. 2. More particularly, each of the flanges 78, 92 have a plurality of circumferentially spaced tabs 214, 216 formed thereon. They mate together at an interface 218 shown in FIG. 1 to form a generally rectangularly configured trunnion like extension from the joined parts having fore and aft surfaces 220, 222 thereon and further having side surfaces 224, 226 thereon. The engine block 10 has a spider configured, integrally formed support system 228 including fore and aft spider arms 230, 232 cast, respectively, in the housing 12 at flange 14 and in the gasifier spool housing 18 as shown in FIG. 1 each with bent ends 234, 236 with flat surfaces which are located in spaced relationship to the fore and aft surfaces 220, 222. A thermal barrier layer 238, 240 is formed in the space to slidably support the joined tabs 214, 216 for thermal expansion with respect to the block 10. Likewise, the support system 228 includes spider arms 242, 244 as shown in FIG. 2, that have bent ends with guide surfaces 246, 248 thereon that locate and slidably support the surfaces 224, 226 on the tabs 214, 216 to locate the ceramic duct system 26 at circumferentially located points on the scroll member 66 as best shown in FIG. 2.

A like support system is provided to guide and locate the ceramic scroll 152 and backplate 158 at the power turbine rotor 154. It includes joined tabs 250, 252 located at circumferentially spaced points around the peripheral edges of the scroll 152 and backplate 158. The tabs have fore and aft side surfaces as described in the support of the gasifier scroll 66 with respect to the block 10. These surfaces are associated with a spider support system 254 at each of the joined tabs 250, 252 having spider arms 256, 258 formed integrally with the flange 16 and the spool housing 22 as shown in FIG. 1. Likewise, the housing flange 16 has a plurality of side arms 260, 262 to locate the ceramic parts in a circumferential direction with respect to the engine block 10. A thermal diffusion barrier 264 is formed between each of the arms of the spider and the surfaces of the joined tabs 260, 262 to thermally isolate the hot running ceramic components from the metal of the block 10 as well as to support the ceramic parts for relative thermal expansion between the high temperature operating components thereof and a cooler temperature metal of the outer block 10.

By virtue of the aforedescribed support system, the ceramic duct system 26 has the ability to operate through a wide range of engine operating conditions including large swings in temperature of the ceramic components. The thermal swings occur without imposing any excessive strain on the ceramic duct components. As a result, the duct components can be fabricated from high temperature resistance ceramic material having limited mechanical strength characteristics.

In one working embodiment the engine block 10 is fabricated from cast nodular iron such as Ni-Resist ductile iron type D-2 and D-58 at the rear and front supports on block 10 which capture scroll member 66 at the surfaces 220, 232, respectively. The material of the duct components of the ceramic duct system 26 is fabricated from sintered alpha silicon carbide and the rope packing at all the sealed joints is formed from alumina—boria—silica material.

The thermal barrier material on each of the spider support systems 228 is formed of a diffusion barrier such as boron nitride formed at four places on each of the tangs or spider arms to thermally isolate the surfaces of the joined ceramic tabs on the supported duct system from the block 10.

The seal plate 128 is fabricated from mullite, $Al_2O_3 \cdot SiO_2$. It thereby constitutes a thermal dam and transition point for isolating the hot running components of the ceramic duct system 26 from the remainder of the engine structure. The same material can be used for plugs 106, 184.

While the embodiments of the present invention, as herein disclosed, constitute a preferred form, it is to be understood that other forms might be adopted.

The embodiments of the invention in which an exclusive property or privilege is claimed are defined as follows:

1. In a gas turbine engine having a metal engine block for housing a gear train, a combustor, a gasifier spool with a gasifier turbine rotor and a power turbine spool with a turbine rotor, the improvement comprising: first ceramic housing means defining a gasifier turbine rotor chamber, said first ceramic housing means having a center outlet duct and a curved inlet duct segment thereon wrapped around said center outlet duct and inclined with respect to the axis of the gasifier spool and adapted to be connected to the outlet of the combustor for supplying motive fluid to the gasifier spool, a second ceramic housing means defining a chamber for a power turbine rotor located to arrange the axis of the power turbine spool at a point offset from the axis of the gasifier spool, said second ceramic housing means having an inlet duct conformation thereon fit within said curved inlet duct segment and connected to said center outlet duct to bridge the offset distance between the axes of the gasifier spool and the power turbine spool and including a center outlet, said inlet duct conformation having a reduced axial flow length therethrough to reduce pressure loss as motive fluid passes from the gasifier turbine to the power turbine, and means to connect the first and second ceramic housing means to said metal engine block to isolate the supported ceramic components from mechanical and thermal loading during operation of the gas turbine engine.

2. In a gas turbine engine having a metal engine block for housing a rotary regenerator, a gear train, a combustor, a gasifier spool with a gasifier turbine rotor and a power turbine spool with a turbine rotor, the improvement comprising: first ceramic housing means defining a gasifier turbine rotor chamber, said first ceramic housing means having a center outlet duct and a curved inlet duct segment thereon wrapped around said center outlet duct and inclined with respect to the axis of the gasifier spool and adapted to be connected to the outlet of the combustor for supplying motive fluid to the gasifier spool, a second ceramic housing means defining a chamber for a power turbine rotor located to arrange the axis of the power turbine spool at a point offset from the axis of the gasifier spool, said second ceramic housing means having an inlet duct conformation thereon fit within said curved inlet duct segment and connected to said center outlet duct to bridge the offset distance between the axes of the gasifier spool and the power turbine spool and including a center outlet, said inlet duct conformation having a reduced axial flow length therethrough to reduce pressure loss as motive fluid passes from the gasifier turbine to the power turbine, and third ceramic housing means including a curved tubular portion coupled to said center outlet of said second ceramic housing means and including a flared skirt portion for directing the turbine gas flow to said rotary regenerator, and means to connect the first and second ceramic housing means to said metal engine block to isolate the supported ceramic components from mechanical and thermal loading during operation of the gas turbine engine.

3. In a gas turbine engine having a metal engine block for housing a gear train, a combustor, a gasifier spool and a power turbine spool, the improvement comprising: a first ceramic backplate having a peripheral flange thereon, a first ceramic scroll having a peripheral flange thereon joined to said backplate peripheral flange to define a sealed gasifier turbine rotor chamber, said ceramic gasifier turbine scroll having a center outlet duct and a curved inlet duct segment thereon wrapped around said center outlet duct and inclined with respect to the axis of the gasifier spool and adapted to be connected to the outlet of the combustor for supplying motive fluid to the gasifier spool, a ceramic gasifier power turbine transition housing including a second ceramic backplate and a second ceramic scroll, peripheral flanges on said second back plate and said second scroll being joined to one another to form a chamber for a power turbine spool rotor and for locating the axis of the power turbine spool at a point offset from the axis of the gasifier spool, said second scroll having an inlet duct conformation thereon fit within the curved inlet segment of said gasifier turbine scroll and connected to said center outlet duct to bridge the offset distance between the axes of the gasifier spool and the power turbine spool, said inlet duct conformation having a reduced axial flow length therethrough to reduce pressure loss as motive fluid passes from the gasifier spool to the power turbine spool, and means to connect the joined peripheral flanges of said first and second backplates and scrolls to said metal engine block to isolate the supported ceramic components from mechanical and thermal loading during operation of the gas turbine engine.

4. In a gas turbine engine having a metal engine block for housing a rotary regenerator, a gear train, a combustor, a gasifier spool and a power turbine spool, the improvement comprising: a first ceramic backplate having a peripheral flange thereon, a first ceramic scroll having a peripheral flange thereon joined to said backplate peripheral flange to define a sealed gasifier turbine rotor chamber, said ceramic gasifier turbine scroll having a center outlet duct and a curved inlet duct segment thereon wrapped around said center outlet duct and inclined with respect to the axis of the gasifier spool and adapted to be connected to the outlet of the combustor for supplying motive fluid to the gasifier spool, a ceramic gasifier power turbine transition housing including a second ceramic backplate and a second ceramic scroll, peripheral flanges on said second backplate and said second scroll being joined to one another to form a chamber for a power turbine spool rotor and for locating the axis of the power turbine spool at a point offset from the axis of the gasifier spool, said second scroll having an inlet duct conformation thereon fit within the curved inlet segment of said gasifier turbine scroll and connected to said center outlet duct to bridge the offset distance between the axes of the gasifier spool and the power turbine spool, said inlet duct conformation having a reduced axial flow length therethrough to reduce pressure loss as motive fluid passes from the gasifier spool to the power turbine spool, said second scroll having a center outlet, a ceramic exhaust duct including a curved tubular inlet connected to said center outlet of said second scroll, said ceramic exhaust duct further including a flared skirt portion for directing the gas turbine flow to said rotary regenerator, and means to connect the joined peripheral flanges of said first and second backplates and scrolls to said metal engine block to isolate the supported ceramic components from mechanical and thermal loading during operation of the gas turbine engine.

* * * * *